April 20, 1948. R. D. SNYDER 2,439,910
AIR LINE OILER
Filed May 11, 1943
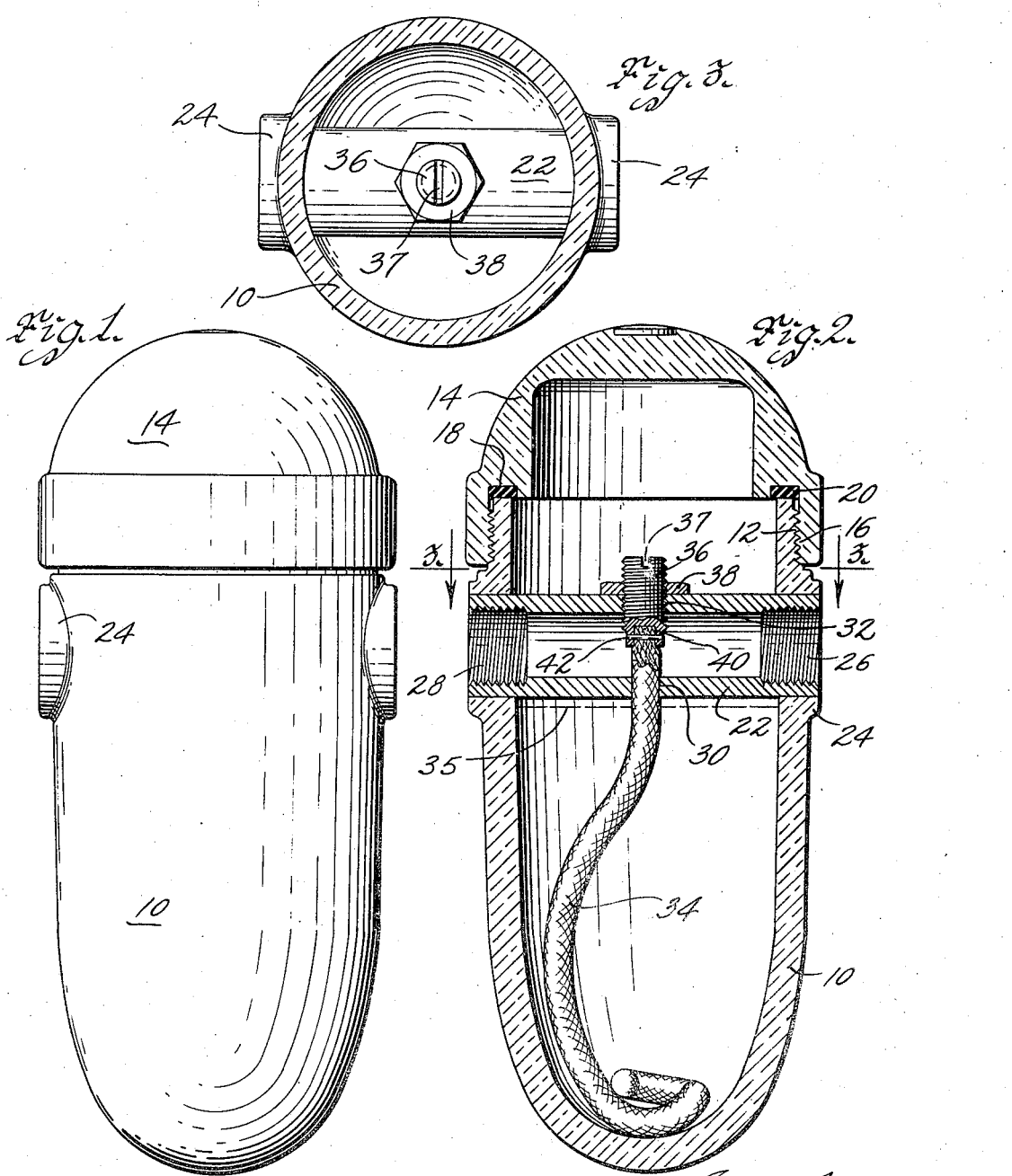
Inventor
Russell D. Snyder
by Bair & Freeman
Attys.

Patented Apr. 20, 1948

2,439,910

UNITED STATES PATENT OFFICE 2,439,910

AIR-LINE OILER

Russell D. Snyder, Bryan, Ohio, assignor to The Aro Equipment Corporation, Bryan, Ohio, a corporation of Ohio Application May 11, 1943, Serial No. 486,598

5 Claims. (Cl. 184—55)

1

My present invention relates to an oiler adapted to be inserted in an air line, such as a compressed air line extending to a pneumatic hammer, drill, impact wrench or the like.

One object of the invention is to provide an air line oiler which produces an oil vapor in the line, as distinguished from drops or slugs of oil, so that the parts of the air-operated tool are properly lubricated without such drops or slugs of oil suddenly entering the tool and interfering with its smooth operation; my arrangement being such, also, that occasional sprays of oil from the exhaust port of the tool are eliminated.

Another object is to provide an air line oiler which has an adjustable feature with relation to the amount of oil vapor introduced into the air stream.

Still another object is to provide an oiler which is effective to accomplish its purpose only when air is flowing through the oiler, the oiler at other times being automatically inoperative and eliminating undesirable flooding of the air line with oil during idle periods.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a side elevation of an air line oiler embodying my invention;

Figure 2 is a vertical sectional view thereof, and

Figure 3 is a horizontal sectional view on the line 3—3 of Figure 2.

On the accompanying drawing, I have used the reference numeral 10 to indicate a casing preferably molded of transparent plastic material. The casing 10 has a threaded neck 12 on which a cover 14 is screwed, the cover itself having screw threads 16. The cover 14 has an annular groove 18 in which is seated a gasket 20 to prevent leakage.

A conduit 22 extends through the casing 10, the conduit being preferably formed of metal and having its ends molded in hubs 24 of the casing. Molding the conduit in position effects a seal between the ends of the conduit and the casing, so that leakage is prevented at the joint between the two. The conduit 22 has its ends internally threaded as at 26 and 28 to receive an air line from an air compressor and a second air line leading to a pneumatic tool to be supplied with air and with lubrication from the oiler.

Conduit 22 has in its lower side an opening 30 and in its upper side a threaded opening 32. A wick 34 extends from within the casing 10 upwardly through the opening 30 and an adjusting screw 36 is positioned in the threaded opening 32. The two are connected together by means of a pin 42, the upper end of the wick extending into a socket 40 through which the pin extends.

The adjusting screw 36 is provided with a lock nut 38 for retaining it at various positions of adjustment. The oiler is designed to assume the vertical position shown in Figures 1 and 2, so that the wick 34 depends from the conduit 32 into the casing 10 and is immersed in oil therein, such oil being preferably at a maximum level, indicated by the dash line 35. The degree of exposure of the wick 34 in the conduit 22 may be varied, in an obvious manner, by rotating the screw 36 so as to raise it for increasing the degree of exposure and rotating the screw to lower it for decreasing the exposure, for a purpose which will hereinafter appear. For convenience in rotating the screw, it may be provided with a screwdriver receiving slot 37.

Practical operation

In the operation of my air line oiler, when there is no air flow through the conduit 22, there is no oil flow into the conduit. The portion of the wick in the conduit remains saturated with oil by capillary attraction, but the oil does not collect as drops in the conduit itself. It may, however, spread as a thin film through a portion of the conduit.

When the air flows through the conduit, as when the pneumatic tool is operated, the oil in the portion of the wick within the conduit is vaporized by the swift flow of air past it, and the vapor serves to lubricate the pneumatic tool without feeding slugs or drops of oil to it, and consequently an oily spray discharge at the exhaust of the tool is eliminated. Furthermore, the tool operates more smoothly when supplied with oil vapor than when drops of oil are permitted to impinge the rapidly moving elements of the tool.

The amount of oil vapor supplied to the tool is automatically proportional to the amount of air passing through the conduit 22 and may be varied by changing the degree of exposure of the wick within the conduit. Preferably, the adjustment 37 is taken care of by a maintenance man, who periodically inspects the oiler and keeps the oil therein at the level 35. Therefore, the adjusting screw is mounted so that it is inaccessible from the outside of the oiler except when the cover 14 is removed.

From the foregoing description, it will be obvious that I have provided an oiler which is automatic in that it furnishes oil vapor in proportion to the amount of air passing therethrough and may be adjusted for changing the amount of oil in respect to the amount of air. The device is further automatic in that oil is not supplied except when air flows through the conduit 22.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In an air line oiler, a casing adapted to contain oil, means for passing air through said casing, a wick extending into said means from the casing and immersed in the oil in said casing, the portion of said wick within said means being exposed in its entirety to the air stream for pick-up of oil from the wick thereby by passage of air around its complete surface, means for adjusting the extent of the projection of said portion into said means, said casing having an open top through which the oil is filled, and a removable cover therefor, said adjustable means being within said casing and thereby accessible only when said cover is removed.

2. An air line oiler of the character described comprising a casing, a removable cover therefor, said casing being formed of transparent plastic material, a conduit through said casing and having its ends molded in opposite walls thereof, said conduit having an opening in the lower side thereof and a threaded opening in the upper side thereof opposite said opening, an adjusting screw threaded in said threaded opening, a wick immersed in the oil in the casing and extending upwardly through said opening, and means for attaching the upper end of said wick to the lower end of said adjusting screw.

3. An air line oiler of the character described comprising a casing, a removable cover therefor, a conduit through said casing and having an opening in the lower side thereof and a threaded opening in the upper side thereof, an adjusting screw threaded in said threaded opening, a wick immersed in the oil in the casing and extending upwardly through said opening, and means for attaching the upper end of said wick to the lower end of said adjusting screw.

4. In an air line oiler of the character described, a casing, a removable cover therefor, said casing being formed of plastic material, a conduit through said casing and having its ends molded in opposite walls thereof, said conduit having an opening in the lower side thereof, a wick immersed in the oil in said casing and extending upwardly through said opening and into said conduit for exposure therein to a stream of air through said conduit and supporting means for said wick connected to the end of the wick within said conduit and spanning one portion of the conduit, the portion of the wick in the conduit spanning the remaining portion thereof and being subject on all sides to the flow of air through the conduit.

5. An air line oiler comprising a casing adapted to contain oil, an air conduit through said casing extending from one side to the other side thereof for conveying the air line through said casing, a wick extending into said conduit from the casing and immersed in the oil contained therein, a portion of said wick within said conduit being exposed to the air stream within the conduit for pick-up of oil from the wick by the air, said casing having an open top through which oil is filled, a removable cover for the casing top opening to the interior of said casing, and an adjustment for the wick extending through the top of said conduit and accessible only when the cover is removed from the casing.

RUSSELL D. SNYDER.

REFERENCES CITED

The following references are of record in the file of this patent:

UNITED STATES PATENTS

| Number | Name | Date |
| --- | --- | --- |
| 1,121,595 | Steedman | Dec. 15, 1914 |
| 1,775,138 | Wood | Oct. 14, 1930 |
| 1,990,524 | Bystricky | Feb. 12, 1935 |
| 2,229,176 | Kehle | Jan. 21, 1941 |

FOREIGN PATENTS

| Number | Country | Date |
| --- | --- | --- |
| 606,261 | Germany | Nov. 28, 1934 |